March 4, 1958 W. F. BOKUM 2,825,523
AUTOMATIC WEIGHER
Original Filed Oct. 25, 1951 2 Sheets-Sheet 1
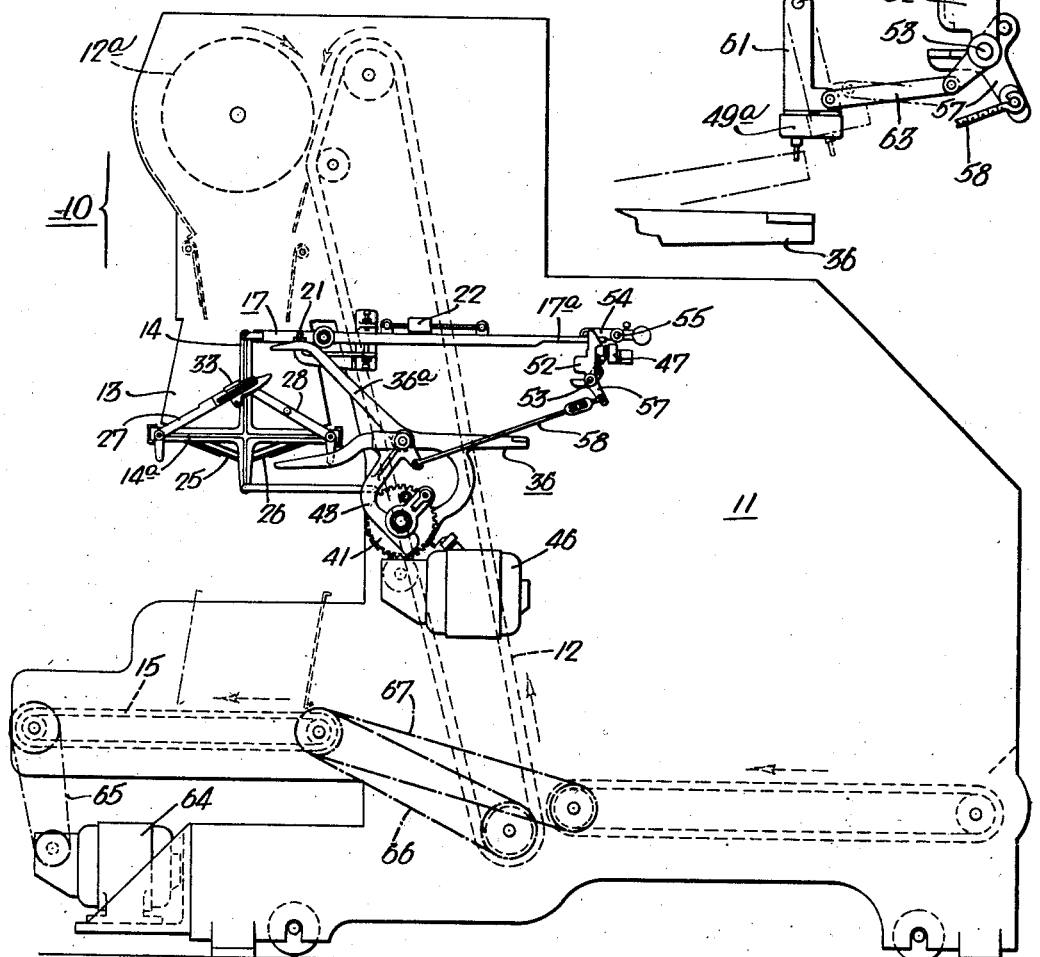
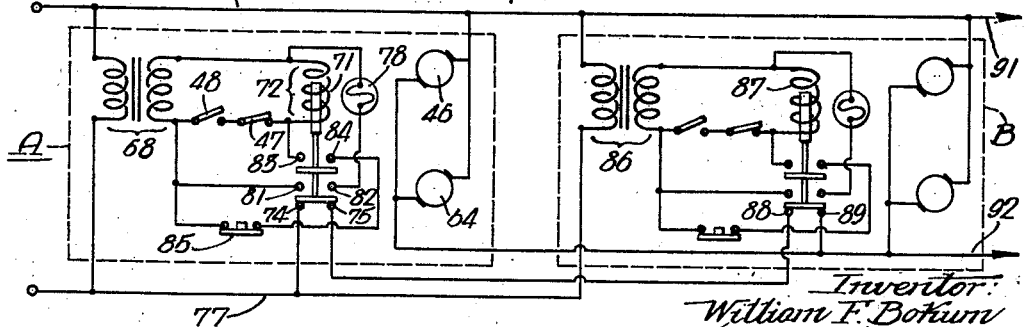
Inventor:
William F. Bokum
by his Attorneys
Howson & Howson

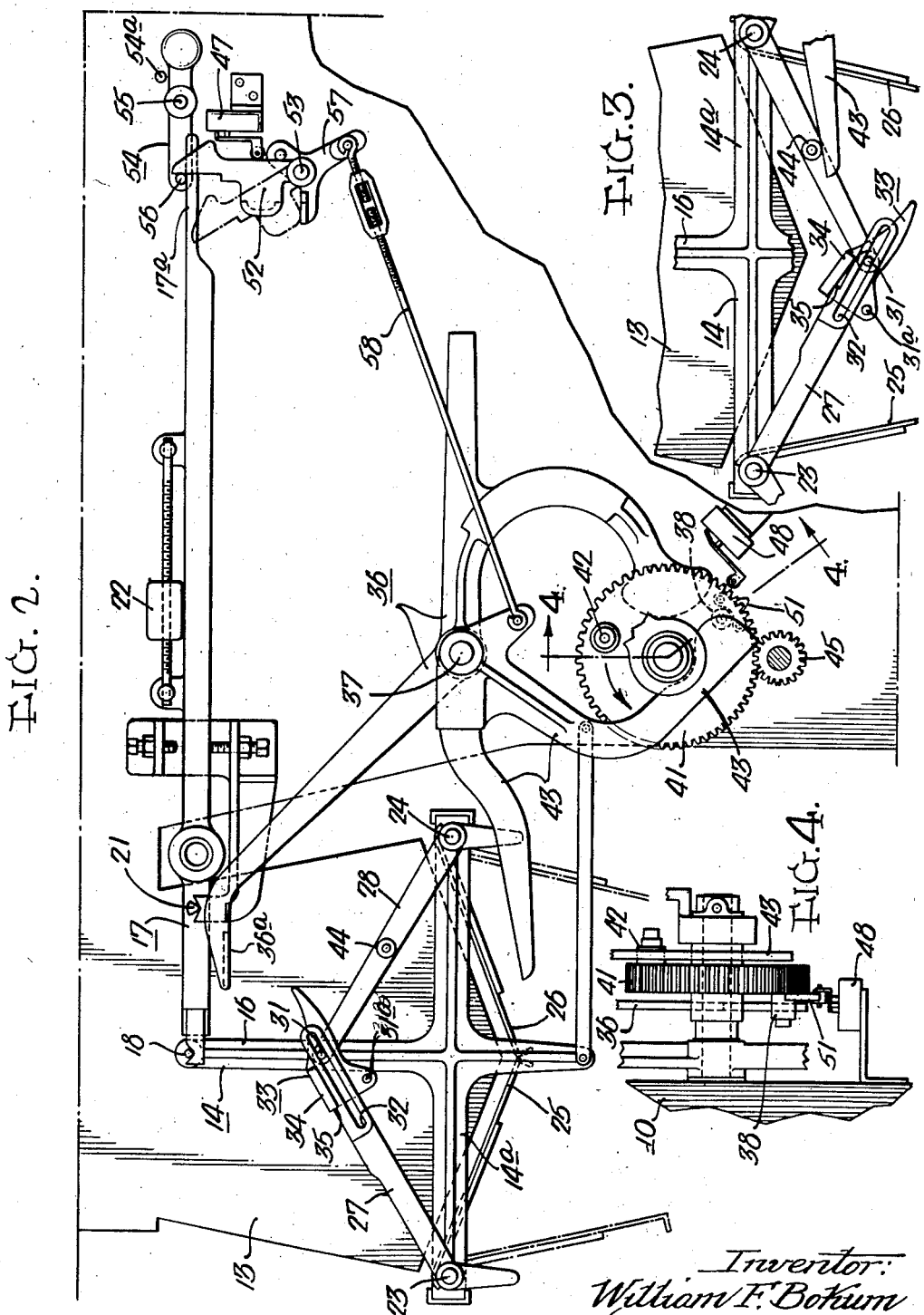

United States Patent Office 2,825,523
Patented Mar. 4, 1958

2,825,523

AUTOMATIC WEIGHER

William F. Bokum, Abington, Pa., assignor to Proctor and Schwartz, Inc., Philadelphia, Pa., a corporation of Pennsylvania Continuation of abandoned application Serial No. 253,044, October 25, 1951. This application February 26, 1954, Serial No. 412,895

12 Claims. (Cl. 249—4)

The present invention relates to new and useful improvements in apparatus for automatically controlling the operation of one or more weighing feeds for fibrous material or the like and the equipment used in association therewith. More, particularly, this invention relates to apparatus for automatically stopping operation of a weighing feed or a multiplicity of such feeds when any particular feed does not contain a predetermined set weight of stock in the scale pan during dumping of the feed. This application is a continuation of my prior application Serial Number 253,044, filed October 25, 1951, now abandoned.

In an automatic weighing feed, for example, of the type illustrated and described in Patents No. 1,660,249, issued February 21, 1928, and No. 1,675,756, issued July 3, 1928, the stock to be weighed is removed from a hopper by a spike conveyor and deposited in a scale pan. The scale pan is carried by a pivotally mounted scale arm and when the desired amount of stock is placed in the scale pan, movement of the scale arm stops operation of the spike conveyor. The stock in the scale pan is dumped at predetermined intervals for example, by means of a timing cam which causes a pair of doors at the bottom of the scale pan to be opened and then closed. The timing cam is arranged so that during a normal operation of the automatic weighing feed the scale pan receives the desired amount of stock prior to the dumping operation.

It is a characteristic of all weighing feeds, that the weight of stock delivered to the scale pan varies within reasonable limits. In general, these fluctuations in weight are of a small magnitude and the effect of the fluctuations when held within prescribed limits are not detrimental. However, in some rare instances, the amount of stock delivered to the scale pan within the timing cycle is not sufficient to trip the scale arm. When this happens, the control system of the present invention operates to stop the weighing feed, or the entire battery of weighing feeds if a series of such machines are being used to produce a blend of various types of stock.

With the foregoing in mind, the principal object of the present invention is to provide novel apparatus for automatically controlling the operation of one or more weighing feeds and their associated equipment and for stopping such feeds when any one of them does not contain a predetermined set weight of stock in the scale pan during dumping of the feed.

Another object of the present invention is to provide novel apparatus for stopping operation of a weighing feed and its associated equipment if a predetermined weight of stock is not present in the scale pan during dumping the feed and also, if a plurality of weighing feeds are being used in conjunction with each other, to give a signal to indicate which weighing feed has not received the proper amount of stock.

A still further object of the present invention is to provide novel apparatus of the stated character which may be attached readily to existing weighing feeds without the necessity of making substantial alterations in the feeds.

These and other objects of the present invention and the various features and details of the operation and construction thereof are hereinafter more fully set forth and described with reference to the accompanying drawings, in which:

Fig. 1 is a side elevational view of an automatic weighing feed embodying the present invention;

Fig. 2 is an enlarged fragmentary side elevational view of the dumping mechanism for an automatic weighing feed made in accordance with the present invention;

Fig. 3 is a fragmentary side elevational view illustrating the dumping mechanism in its open position;

Fig. 4 is an enlarged fragmentary sectional view taken on line 4—4, Fig. 2;

Fig. 5 is an enlarged fragmentary side elevational view of a modified form of the control mechanism; and, Fig. 6 is a schematic wiring diagram illustrating the control mechanism for a pair of weighing feeds.

The present invention consists essentially of control mechanism operable to stop operation of a weighing feed and its associated equipment if the proper amount of stock is not contained by the scale pan during the dumping operation. In an automatic weighing feed, two separate control systems are used to stop operation of the spike apron which deposits the stock in the scale pan and to empty the scale pan. Operation of the spike apron is stopped when the desired amount of stock is deposited in the scale pan and the scale pan is dumped at predetermined fixed intervals by means of a continuously rotating cam. It is usual practice to adjust the speed of the spike apron so that the scale pan received the desired amount of stock in approximately two-thirds of the timing cycle of the dumping cam. The present invention provides control mechanism associated with the scale arm of the feed which is operable to stop operation of the feed and all associated equipment if the scale pan does not contain the desired amount of stock during dumping of the scale pan.

Referring now more particularly to the drawings, reference numeral 10 designates generally an automatic weighing feed of conventional design, comprising a supply bin 11 and a spike conveyor 12 which operates to remove stock from the supply bin 11 and transport it upwardly in the weighing feed. The stock is removed from the upper end of the spike conveyor by a doffer 12a and falls by gravity into a hopper 13 the bottom of which normally is closed by a scale pan, generally designated 14. The scale pan includes a pair of doors 25, 26, respectively, which are opened at predetermined fixed intervals to deposit the stock therein upon an apron conveyor 15 for transporting to some further treating apparatus (not shown).

More particularly the scale pan 14 as illustrated in Fig. 2 comprises a generally rectangular open frame 14a positioned beneath the lower end of the hopper 13. The frame 14a is supported by the extreme forward end of a scale beam 17, for example, by means of an arm 16 which is formed integrally with the frame and extends upwardly therefrom. A knife-edge 18 carried by the arm 16 in engagement with the scale beam 17 limits the frictional resistance between the beam and the arm. The scale beam 17 is pivotally mounted to the side wall of the weighing feed as indicated at 21 and has an adjusting weight 22 adjustably mounted thereon to permit the scale pan to be balanced with any desired amount of stock therein.

Extending longitudinally of the frame 14a at opposite sides thereof are a pair of rotatably mounted shafts 23 and 24, each of which mounts one of the scale pan doors 25 and 26 respectively. The doors extend transversely across the opening in the lower end of the hopper 13 and support the stock discharged from the spike conveyor 12. The shafts 23 and 24 are rotatable between predetermined limit positions to effect opening and closing of the scale pan doors.

Fixedly secured to each of the shafts 23 and 24 and extending angularly upward therefrom toward the center of the hopper 13 is a pair of operating levers 27 and 28, respectively. Carried by the extreme end portion of the lever 28 is a pin 31 which engages a longitudinal slot 32 in the lever 27 to permit relative predetermined movement of the ends of the levers 27 and 28 with respect to each other. Pivotally mounted on the pin 31 is a latch 33 having an outwardly projecting lug 34 thereon adapted to be engaged by a shoulder 35 on the lever 27 to releasably maintain the levers 27 and 28 in a predetermined limit position. Engagement of the shoulder 35 with the latch 33 maintains the scale pan doors 25 and 26 in their closed position. However, upon the clockwise rotation of the latch 33 about the pin 31, with respect to Fig. 2, the lug 34 is disengaged from the shoulder 35, thereby permitting relative movement of the levers 27 and 28 and causing the scale pan doors 25 and 26 to open. The scale pan doors normally tend to drop to their open position due to the force of gravity.

Actuation of the latch 33 to permit dumping of the scale pan is accomplished by means of a dump lever 36 configurated, for example, as illustrated in Figs. 1 and 2. The dump lever 36 is pivotally mounted at its midpoint for movement between predetermined limit position on a trunnion 37 secured to the side wall of the weighing feed and is over-balanced in such a manner as to be maintained normally in its extreme clockwise limit position. The dump-lever 36 is actuated to its counter-clockwise limit position by means of a cam roller 38 carried by a continuously rotating gear 41. Upon engagement of the cam roller 38 with the dump-lever 36, the dump-lever is rotated counter-clockwise with respect to Fig. 2, about the trunnion 37 and the extreme forward end portion 36a of the dump-lever contacts the latch 33, thereby disengaging the latch 33 from the shoulder 35 and causing the scale pan doors 25 and 26 to be opened.

Also carried by the gear 41 is a second cam roller 42 which operates to engage and actuate a reset lever 43. The reset lever is pivotally mounted at its mid-point on the trunnion 37 for movement between predetermined limit positions. In the extreme counter-clockwise limit position of the reset lever 43, as illustrated in Figs. 2 and 3, the reset lever is adapted to be engaged by a roller 44 carried by the operating lever 28 when the scale pan doors are open as illustrated in Fig. 3, thereby limiting the downward movement of the levers 27 and 28. Upon engagement of the cam roller 42 with the reset lever 43, the reset lever is pivoted in the clockwise direction with respect to Fig. 2 and elevates the arms 27 and 28 to their upper limit position, thereby causing the latch 33 to again engage the shoulder 35. The cam rollers 38 and 42 are mounted in predetermined positions on the gear 41 so that the scale pan is opened and closed at predetermined fixed intervals. The gear 41 is rotated in the counter-clockwise direction with respect to Fig. 2 by means of a pinion 45 driven, for example, by a synchronous motor 46 which synchronizes the dumping cycle of the scale pan with the speed of the apron conveyor 15.

As previously described, the entire scale pan assembly 14 is carried by the pivotally mounted scale beam 17 which has an adjusting weight 22 thereon operable to permit balancing of the scale pan with any desired weight of stock therein. When the desired amount of stock is placed in the scale pan, the scale beam 17 is actuated in the counter-clockwise direction about the point 21 and operation of the spike conveyor 12 which deposits the stock in the scale pan is stopped in the usual manner. Automatic weighing feeds of this type normally are adjusted so that the scale pan receives the desired amount of weight in approximately two-thirds of the time interval between closing and opening of the scale pan doors. By this construction, the scale pan normally has the proper amount of stock therein prior to be dumped. Closing the scale pan doors 25 and 26 after the dumping operation starts operation of the spike conveyor 12 to permit stock to again be deposited onto the scale pan.

In accordance with the present invention, control mechanism is provided which is automatically operable to shut-down the operation of the weighing feed in the event that the scale pan makes a "light" dump, that is to say, the scale pan is dumped without receiving, or when it has not received, its predetermined weight. In the present instance, this is accomplished by breaking the electric circuit to the weighing feed and its associated equipment at the dumping operation if the scale pan does contain the desired quantity of stock, as more fully described herein after. To this end, a pair of switches 47 and 48 are provided which are operated, respectively, by the scale beam 17 and cam roller 38. The switch 47 normally is closed and is adapted to be opened when the scale pan receives the desired quantity of stock, while the switch 48 normally is open and adapted to be momentarily closed during the dumping operation by a switch operating member 51 mounted on the gear 41 and arranged to engage and close these said switch 48. The switches 47 and 48 are in series, as more fully described hereinafter, and hence, if both of the switches are closed at the same time a relay, hereinafter identified, is energized which will break the electric circuit to the weighing feed and its associated equipment.

As previously mentioned, the switch 47 is maintained in the closed position when the scale pan does not have the desired quantity of stock therein. This is accomplished by means of a trigger element 52 pivotally mounted on a trunnion 53 secured to the side wall of a weighing feed and over-balanced normally to tend to rotate in the counter-clockwise direction with respect to Fig. 2. The trigger 52 is maintained in engagement with the switch 47 by means of a counter-weighted latch 54 pivotally mounted at its mid-point to the side wall of the weighing feed as indicated at 55. The weighted latch 54 has a latch pin 56 extending outwardly therefrom which engages the trigger element 52 and maintains the same in engagement with the switch 47. The extreme rearward end 17a of the scale arm 17 is positioned immediately beneath the latch pin 56 in engagement therewith. When the scale pan has received the desired quantity of stock, the scale arm 17 is actuated about the point 21 in the counter-clockwise direction, thereby raising the latch pin 56 and removing the same from engagement with the trigger element 52. This permits the trigger element 52 to fall forward out of engagement with the switch 47, thereby opening the same and preventing the weighing feed and its associated equipment from being stopped when the switch 48 is closed, as more fully described hereinafter. Upon downward movement of the trigger element the counter-weighted latch 54 pivots in the counter-clockwise direction to a position where it engages a stop 54a.

Pivotally mounted on the trunnion 53 is a reset arm 57 which is operable to engage the trigger element 52 and position the same behind the latch pin 56. The reset arm 57 is interconnected with the reset lever 43 by means of an adjustable connecting rod 58 which is secured to the reset lever 43 and reset arm 57. Operation of the reset lever 43 by means of the cam roller 42 causes clockwise rotation of the reset arm 57 about the pinion 53, thereby positioning the trigger element 52 behind the latch pin 56. By this construction, it will be observed that the switches 47 and 48 both will be closed at the same time only if the scale pan does not contain the desired quantity of stock when it is dumped.

A modified form of the present invention is illustrated in Fig. 5. In this embodiment a normally open switch 49a is provided and is operable to be closed by the dump lever 36. The dumping lever is operable to engage and close the switch 49a immediately prior to engagement of the forward end 36a of the dumping lever with the latch 33, thereby stopping operation of the weighing feed and its associated equipment if the scale pan is dumped when it has not received the desired quantity of stock. On the other hand if the scale pan has received the desired quantity of stock, the switch 49a is removed from the path of travel of the dumping lever 36, thus permitting continuous operation of the weighing feed. This is accomplished by mounting the switch 49a on a switch bracket 61 pivotally mounted to the side wall of the weighing feed as indicated at 62. The switch bracket 61 is connected with the trigger element 52 by means of a tie-rod 63 so that rotation of the trigger element 52 after elevation of the rear end 17a of the scale beam 17 causes the switch 49a and the switch bracket 61 to be moved to the position shown in broken lines in Fig. 5 out of the path of travel of the dump lever 36. This modification illustrated in Fig. 5 permits a single switch 49a to be substituted in place of the two switches 47 and 48, illustrated in Fig. 2.

The automatic weighing feed as illustrated in Fig. 1 is operated by means of a motor 64 which drives the spike conveyor 12, the doffer 12a, the apron conveyor 15 and the conveyor which feeds the stock to the spike apron. The apron conveyor 15 is driven, for example, by means of a chain 65 and in turn drives the spike conveyor and the conveyor which feeds the stock to the spike conveyor, for example, by means of a pair of chains 66 and 67, respectively. By this construction, when the electrical circuit is broken to the motors 46 and 64 the operation of the entire weighing feed will stop.

Fig. 6 is a schematic diagram of the electric circuit used in conjunction with a pair of weighing feeds of the type illustrated in Figs. 1 and 2. The controls enclosed within the broken lines as indicated at A correspond to the controls in the machine illustrated in Fig. 1 while the controls enclosed within the dotted line as indicated at B represent the control mechanism for a second automatic weighing feed (not shown). With reference to the controls enclosed within the dotted lines as indicated at A, a transformer 68 is provided across the power line to decrease the voltage in the control system. The switches 47 and 48 are in series with each other and when they are both closed a relay coil 71 is energized. Energizing the coil 71 actuates a relay 72 and opens the contacts 74 and 75. This in turn breaks the circuit through the conductors 76 and 77 which supply the current to both of the automatic weighing feeds and their associated equipment. At the same time a circuit is completed through a lamp or other signaling device 78. This circuit is completed from the transformer, through the contacts 81 and 82, through the lamp 78 and then back to the transformer.

Energizing the coil 71 also completes a holding circuit for the relay coil 71 through the contacts 83 and 84 which maintain the coil energized after one of the switches 47 or 48 is opened. The holding circuit is completed from one side of the transformer through the coil 71, the contacts 83 and 84, through a normally closed reset switch 85 and then to the other side of the transformer. The weighing feed and its associated equipment may be started by opening the reset switch 85 which deenergizes the coil 71 and permits the circuit in the line to be completed through the contacts 74 and 75.

The control circuit for the second weighing feed used in conjunction with the above described weighing feed is exactly the same as the control circuit for the first weighing feed and comprises a transformer 86 and relay coil 87. Energizing the relay coil 87 breaks a circuit through contacts 88 and 89 which are in series with the above mentioned contacts 74 and 75. By this construction when either the relay coil 71 or the relay coil 87 is energized both of the weighing feeds will be stopped. However, the signaling device which is provided on each of the weighing feeds will indicate which weighing feed is not operating correctly. Electric current is provided for all of the auxiliary equipment used in conjunction with the weighing feeds through the conductors 91 and 92. By this arrangement it will be observed that when either of the relays 71 or 87 is energized, due to the completion of a circuit through the switches 47 and 48 by virtue of the scale pan not containing the predetermined amount of weight at the dumping operation, the circuit through the conductors 91 and 92 will be broken and operation of all of the equipment used in conjunction with the weighing feeds will be stopped.

From the foregoing it will be observed that the present invention provides novel control mechanism for automatically stopping the operation of a plurality of weighing feeds and their associated equipment if a feed is dumped when its scale pan does not contain a predetermined weight of stock, and also give a signal to indicate which weighing feed has not received the proper amount of stock. In addition, the control system of the present invention may be used in conjunction with a single weighing feed and stop operation of the feed if it is dumped without containing the desired weight of stock.

While particular embodiments of the present invention have been illustrated and described herein, it is not intended to limit the invention to such disclosures and changes and modifications may be incorporated and embodied therein within the scope of the following claims.

I claim:

1. In an automatic weighing feed, an endless conveyor operable to transport material, a scale pan positioned to receive material from one end of said conveyor, a pivotally mounted scale beam supporting said scale pan and movable thereby from a predetermined position when the scale pan has received a predetermined weight of material, dump mechanism operable to dump said scale pan at predetermined regular intervals and discharge the material therefrom, an electric circuit including drive means for said conveyor and said dump mechanism, a relay in said circuit actuatable when energized to open said circuit and stop said drive means, switch means actuatable by said dump mechanism and operable in said predetermined position of the scale beam to energize said relay, and control means operable in response to movement of said scale beam from said predetermined position to thereby render said switch means inoperative to energize said relay.

2. In an automatic weighing feed, an endless conveyor operable to transport material, a scale pan positioned to receive material from one end of said conveyor, a pivotally mounted scale beam supporting said scale pan and movable thereby from a predetermined position when the scale pan has received a predetermined weight of material, dump mechanism operable to dump said scale pan at predetermined regular intervals and discharge the material therefrom, an electric circuit including drive means for said conveyor and said dump mechanism, a relay in said circuit actuatable when energized to open said circuit and stop said drive means, a pair of series connected switches in said circuit operable to energize said relay when both of said switches are closed, a switch operating member carried by said dump mechanism and operable prior to each scale pan dumping operation thereof to engage and close one of said switches, and control mechanism operable in said predetermined position of the scale beam to maintain the other of said switches in the closed position, said control mechanism being actuatable upon movement of said scale beam from said predetermined position to open said other switch and thereby prevent energization of said relay upon closing of said one switch.

3. In an automatic weighing feed, an endless conveyor operable to transport material, a scale pan positioned to receive material from one end of said conveyor, a pivotally mounted scale beam supporting said scale pan and movable thereby from a predetermined position when the scale pan has received a predetermined weight of material, a lever operable to dump said scale pan and discharge the material therefrom, cam means operable to actuate said lever and dump said scale pan at predetermined regular intervals, an electric circuit including drive means for said conveyor and said cam means, a relay in said circuit actuatable when energized to open said circuit and stop said drive means, a pair of series connected switches in said circuit operable to energize said relay when both of said switches are closed, a switch operating member carried by said cam means and operable prior to each pan dumping operation thereof to engage and close one of said switches, and control mechanism operable in said predetermined position of the scale beam to maintain the other of said switches in the closed position, said control mechanism being actuatable upon movement of said scale beam from said predetermined position to open said other switch and thereby prevent energization of said relay upon closing of said one switch.

4. In an automatic weighing feed, an endless conveyor operable to transport material, a scale pan positioned to receive material from one end of said conveyor, a pivotally mounted scale beam supporting said scale pan and movable thereby from a predetermined position when the scale pan has received a predetermined weight of material, a lever operable to dump said scale pan and discharge the material therefrom, cam means operable to actuate said lever and dump said scale pan at predetermined regular intervals, an electric circuit including drive means for said conveyor and said cam means, a relay in said circuit actuatable when energized to open said circuit and stop said drive means, switch means actuatable by said lever and operable in said predetermined position of the scale beam to energize said relay, and control means operable in response to movement of said scale beam from said predetermined position to thereby render said switch means inoperative to be actuated by said lever and energize said relay.

5. In an automatic weighing feed, an endless conveyor operable to transport material, a scale pan positioned to receive material from one end of said conveyor, a pivotally mounted scale beam supporting said scale pan and movable thereby from a predetermined position when the scale pan has received a predetermined weight of material, dump mechanism operable to dump said scale pan at predetermined regular intervals and discharge the material therefrom, an electric circuit including drive means for said conveyor and said dump mechanism, a relay in said circuit actuatable when energized to open said circuit and stop said drive means, a normally open switch in said circuit operable when closed to energize said relay, a member mounting said switch for engagement with said dump mechanism to permit said dump mechanism upon actuation thereof to engage and close said switch, and control mechanism in engagement with said mounting member and said scale beam and operable upon movement of said scale beam from said predetermined position to prevent engagement of said switch by said dump mechanism and thereby prevent energization of said relay.

6. In an automatic weighing feed, an endless conveyor operable to transport material, a scale pan positioned to receive material from one end of said conveyor, a pivotally mounted scale beam supporting said scale pan and movable thereby from a predetermined position when the scale pan has received a predetermined weight of material, a lever operable to dump said scale pan and discharge the material therefrom, cam means operable to actuate said lever and dump said scale pan at predetermined regular intervals, an electric circuit including drive means for said conveyor and said cam means, a relay in said circuit actuatable when energized to open said circuit and stop said drive means, a normally open switch in said circuit operable when closed to energize said relay, a member mounting said switch in the path of travel of said lever to permit said switch to be engaged and closed by said lever, and control mechanism in engagement with said mounting member and said scale beam operable when said scale beam is in said predetermined position to maintain said switch in the path of travel of said lever, said control mechanism being actuatable upon movement of said scale beam from said predetermined position to remove said switch from the path of travel of said lever and thereby prevent energization of said relay.

7. In material handling apparatus comprising a plurality of weighing feed devices each having a scale pan and an endless conveyor operable to deposit material therein, a pivotally mounted scale beam on each weighing feed supporting said scale pan and separately movable thereby from a predetermined position when the scale pan has received a predetermined weight of material, dump mechanism on each weighing feed operable to dump the scale pan, an electric circuit including drive means for the conveyors and dump mechanism of each weighing feed, stop means associated with each weighing feed operable when actuated to stop the drive means for the conveyors and dump mechanisms of said plurality of weighing feeds, and control means associated with each weighing feed operable in response to movement of the scale beam of its associated weighing feed from said predetermined position to thereby render the stop means of its associated weighing feed inoperative.

8. In material handling apparatus comprising a plurality of weighing feed devices each having a scale pan and an endless conveyor operable to deposit material therein, a pivotally mounted scale beam on each weighing feed supporting said scale pan and separately movable thereby from a predetermined position when the scale pan has received a predetermined weight of material, time controlled dump mechanism on each weighing feed operable to dump the scale pan periodically at predetermined regular intervals, an electric circuit including drive means for the conveyors and dump mechanism of each weighing feed, a relay associated with each weighing feed connected in said circuit in series with the relays of the other weighing feeds, each of said relays being operable when energized to open said circuit and stop the drive means for the conveyors and dump mechanisms of said plurality of weighing feeds, a first switch associated with the scale beam of each weighing feed, said switch being closed in said predetermined position of the scale beam and opened upon movement of the scale beam from said predetermined position, and a second switch associated with the dump mechanism of each weighing feed and actuatable thereby to a closed position during each operation of the dump mechanism, said first and second switches of each weighing feed being connected in series with each other and being operable when both are closed to energize the relay associated with such weighing feed and thereby open said circuit and stop operation of the drive means for the conveyors and dump mechanisms of said plurality of weighing feeds.

9. In material handling apparatus comprising a plurality of weighing feed devices each having a scale pan and an endless conveyor operable to deposit material therein, a pivotally mounted scale beam on each weighing feed supporting said scale pan and separately movable thereby from a predetermined position when the scale pan has received a predetermined weight of material, time controlled dump mechanism on each weighing feed operable to dump the scale pan periodically at predetermined regular intervals, an electric circuit including drive means for the conveyors and dump mechanism of each weighing feed, first switch means cooperatively associated with the scale beam of each weighing feed and actuatable thereby between an open and a closed position upon movement of the scale beam to and from said predetermined position, second switch means cooperatively associated with the dump mechanism of each weighing feed and actuatable between an open and a closed position, said second switch means being actuated to one of said positions during each dumping operation, relay means associated with each weighing feed and actuatable between closed circuit and open circuit positions, each relay means connected in said circuit in series with the relay means of the other weighing feeds and operable in the open circuit positions thereof to stop the drive means for the conveyors and dump mechanism of all of the weighing feeds, and means interconnecting the said first and second switch means of each weighing feed with the relay means of their associated weighing feed and operable when the scale arm is in said predetermined position during dumping of the scale pan to actuate said relay means to its open circuit position.

10. In apparatus for treating material comprising a plurality of weighing feed devices each having a scale pan and an endless conveyor operable to deposit material therein, a pivotally mounted scale beam on each of said feed devices supporting said scale pans and separately movable thereby from a predetermined position when its scale pan has received a predetermined weight of material, dump mechanism on each of said devices operable to dump its scale pan independently at predetermined regular intervals and discharge the material therefrom, an electric circuit including drive means for the conveyors and dump mechanism of each feed device, a plurality of serially connected relays in said circuit one for each of said feed devices and actuatable upon energization of any one relay to open said circuit and stop said drive means, switch means in said circuit associated with each of said feed devices actuatable by its dump mechanism to energize one of said relays, and control means on each of said feed devices operable in response to movement of its scale beam from said predetermined position to thereby render said switch means inoperative to energize said relay.

11. In apparatus for treating material comprising a plurality of weighing feed devices each having a scale pan and an endless conveyor operable to deposit material therein, a pivotally mounted scale beam on each of said feed devices supporting said scale pans and separately movable from a predetermined position when the scale pan it supports has received a predetermined weight of material, a lever on each of said feed devices operable to dump the scale pans and discharge the material therefrom, cam means on each of said feed devices operable to actuate said levers and dump said scale pans independently at predetermined regular intervals, an electric circuit including separate drive means for the conveyors and cam means of each feed device, a plurality of relays serially connected in said circuit one for each of said feed devices and actuatable upon energization of any one relay to open said circuit and stop said drive means, a plurality of pairs of series connected switches in said circuit corresponding in number to said plurality of feeds, each of said pair of switches associated with a separate feed device and a separate relay and operable to energize its associated relay when both of said switches are closed, a switch operating member carried by each of said cam means and operable prior to each pan dumping operation thereof to engage and close one of said pair of switches associated with said feeds, and control mechanism on each of said feed devices operable in said predetermined position of the scale beam on said feeds to maintain the other switch of said pair of switches in the closed position, said control mechanisms being actuatable upon movement of said scale beams from said predetermined position to open said other switch and thereby prevent energization of said relays upon closing of said one switch.

12. In apparatus for treating material comprising a plurality of weighing feed devices each having a scale pan and an endless conveyor operable to deposit material therein a pivotally mounted scale beam on each of said feed devices supporting said scale pans and separately movable from a predetermined position when the scale pan it supports has received a predetermined weight of material, a lever on each of said feed devices operable to dump the scale pans and discharge the material therefrom, cam means on each of said feed devices operable to actuate said levers and dump said scale independently at predetermined regular intervals, an electric circuit including separate drive means for conveyors and cam means, a plurality of relays serially connected in said circuit one for each of said feed devices and actuatable upon energization of any one relay to open said circuit and stop said drive means, a plurality of normally open switches in said circuit corresponding in number to said plurality of feed devices, each of said switches associated with a separate feed device, and a separate relay and operable when closed to energize its associated relay, a member on each of said feeds mounting a switch in the path of travel of the lever on said feed device to permit said switches to be engaged and closed by said levers, and control mechanism on each of said feed devices in engagement with said mounting members and said scale beams operable when the scale beam on said feed is in said predetermined position to maintain said switch in the path of travel of said lever, said control mechanisms being actuatable upon movement of said scale beams from their predetermined position to remove said switches from the paths of travel of said levers and thereby prevent energization of said relays.

References Cited in the file of this patent

UNITED STATES PATENTS

| | | |
|---|---|---|
| 1,531,944 | Howe | Mar. 31, 1925 |
| 1,531,945 | Howe | Mar. 31, 1925 |
| 1,660,249 | Bokum | Feb. 21, 1928 |
| 1,675,756 | Howe | July 3, 1928 |
| 2,179,743 | Howe | Nov. 14, 1939 |
| 2,380,733 | Durning | July 31, 1945 |
| 2,443,350 | Gilbert et al. | June 15, 1948 |
| 2,579,708 | Smith et al. | Dec. 25, 1951 |
| 2,650,058 | Read | Aug. 25, 1953 |
| 2,660,393 | O'Connor et al. | Nov. 24, 1953 |